United States Patent Office 3,408,726
Patented Nov. 5, 1968

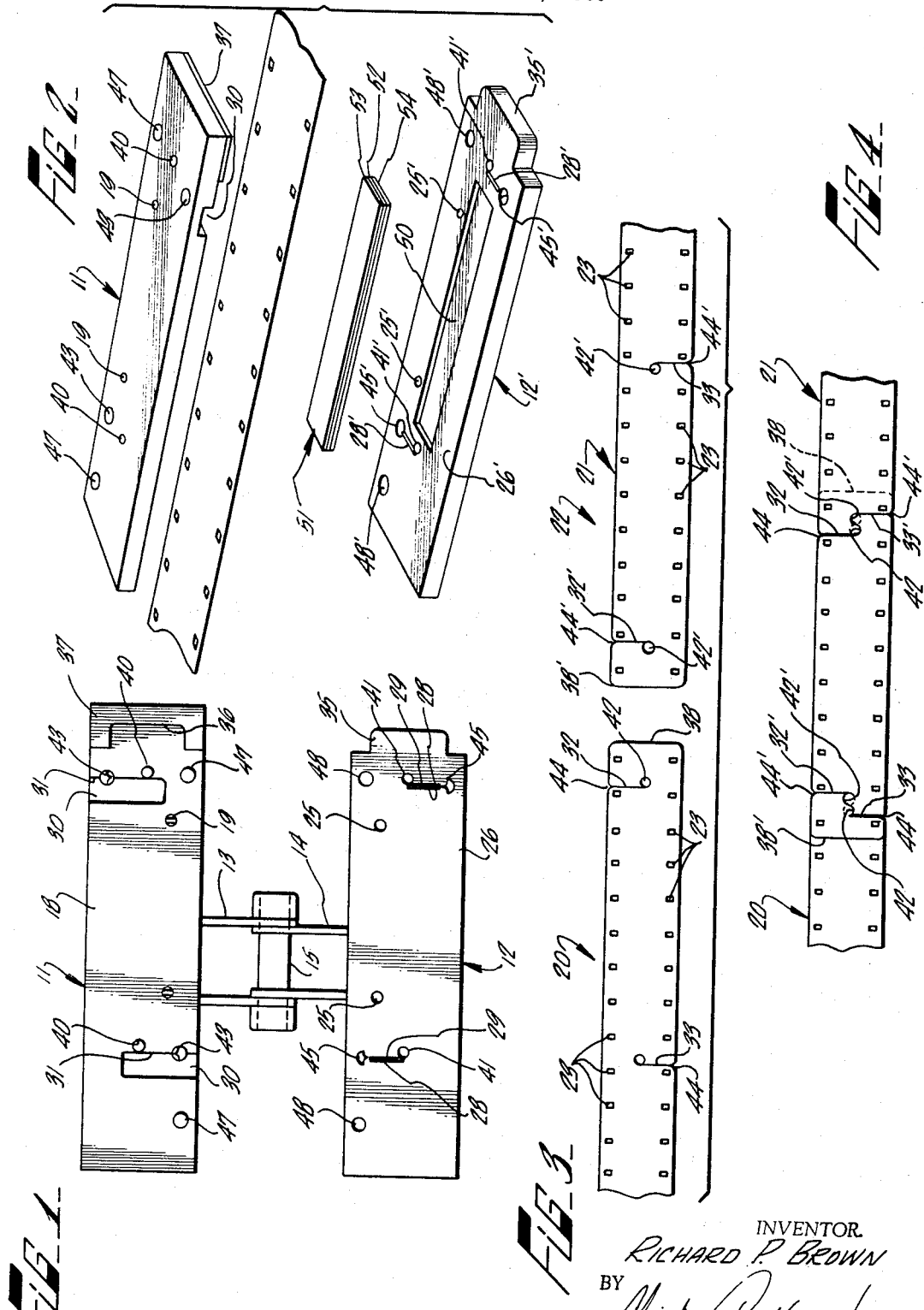

3,408,726
FILM SPLICING TOOL AND METHOD
Richard P. Brown, Monrovia, Calif., assignor to Consolidated Electrodynamics Corporation, Pasadena, Calif., a corporation of California
Filed Dec. 3, 1965, Ser. No. 511,384
4 Claims. (Cl. 29—450)

ABSTRACT OF THE DISCLOSURE

A method of forming a splice between two lengths of photographic film having uniformly spaced marginal sprocket holes in which first and second slits extending halfway across the width of the film length are formed in the terminal portion of each length of film at locations equally spaced from each other. The first slits extend from one edge of the film adjacent the ends of the terminal portions and the second slits extend from the other edge of the film at locations spaced from the ends of the film terminal portions. The film terminal portions are interlinked so that they overlie each other between the second slits and the ends thereof with the respective edges of the film lengths being aligned. Interlinking is achieved by engaging the first slit of each film length in the second slit of the other film length. The first and second slits are formed at such locations along the film lengths that the sprocket holes of one film length register with the sprocket holes of the other film length when the film lengths are interlinked.

---

This invention relates to the art of splicing together the free ends of two strips of material. More particularly, it relates to a method for mechanically splicing together the free ends of a motion picture film to repair a break in the film. The invention also relates to a tool for preparing the film ends for mechanical interconnection.

It has long been believed and accepted that the only workable method of repairing a break in a motion picture film is to trim the ends of the film strips produced by a break in the strip, to overlay the ends of the film so that the strips are aligned and the sprocket holes in the film strips are registered with each other, and to bond the overlaid ends of the strips together to produce a single film strip. The overlaid strip ends may be bonded to each other by the use of a suitable glue or adhesive, but more conventionally this bond is accomplished by a solvent welding process or by heat fusing the overlaid ends together. It has long been accepted that a splice in a motion picture film must not produce any loose edges transversely of the film if the spliced film is to move properly through a motion picture projector. Accordingly, conventional splicing techniques and processes provide a bond across the entire area common to the overlaid ends of the severed film strip. An alternative to bonding together the overlaid ends of the trimmed ends of the film strips is a splicing process wherein the trimmed ends of the strips are abutted in mating relation and are fused together; this technique, in the context of this invention is the equivalent of a splicing technique wherein the severed ends of the film are overlaid.

I have found that, contrary to the teachings explicit in the conventional splicing techniques, it is not necessary to avoid the provision of free edges in the joint between two lengths of motion picture film, and that a joint having free or unbonded film edges will pass through a projector without damaging either the film or the projector. This invention, accordingly, provides a novel method for mechanically interconnecting the ends of two lengths of motion picture film to repair a break in a film or to connect one film to the trailing end of another film. The method does not require the use of any adhesives, solvents or fusion processes, although an adhesive may be used in my joint if desired. This invention also provides a novel tool for preparing the film strip ends for mechanical interconnection.

My invention has particular utility in conjunction with the motion picture projection system for use in passenger aircraft disclosed in United States Letters Patent No. 3,379,488. Should the film being projected by such a system break at a point in the system, it is a simple matter to rapidly repair the break by the use of apparatus and procedures in accord with this invention. It will be understood, however, that this invention has utility other than in connection with this aircraft film projection system.

Generally speaking, in terms of structure, this invention provides a tool for use in splicing together the ends of lengths of motion picture film and similar strips of material. The tool includes first and second mating die members. One of the die members carries means for registering with a terminal portion of a length of strip material to be spliced to a terminal portion of another length of strip material and for aligning the length in a predetermined position on the one die member. Carried on the first die member at spaced locations fixed relative to the registering and aligning means are slitting die means. The slitting die means form first and second slits in a length of strip material engaged with the registering means, the slits extending partially transversely of the strip from opposite edges of the strip. Cooperating slitting die means are carried by the second die member for coaction with the die means carried by the first die member in response to movement of the die members into mating relation with each other on opposite sides of a length of strip material. The first slit is formed adjacent the end of a length of strip material operated upon by the die members.

In terms of method, each end of two lengths of strip material to be spliced together are prepared to provide first and second slits partially across each length. The slits in each length extend from opposite edges of the lengths inwardly of the ends of the lengths. The splice is made by interlinking the lengths by overlaying the ends of the lengths and engaging the unslitted width of each length laterally of each first slit in the second slit of the other length. Where the lengths are defined by motion picture film having marginal sprocket holes, the slits in one of the lengths are located so that the sprocket holes of the interlinked lengths register with each other when tension is applied to the splice.

The above-mentioned and other features of the invention are more fully set forth in the following detailed description which is presented with reference to the accompanying drawing, wherein:

FIG. 1 is an elevation view of a splicing tool according to this invention;
FIG. 2 is an exploded perspective view of parts of another splicing tool according to this invention;
FIG. 3 illustrates a step of the process of splicing provided by this invention; and
FIG. 4 illustrates a completed splice according to this invention.

A splicing tool 10, shown in FIG. 1, includes a pair of die members 11 and 12. Each die member is carried by a respective one of a pair of levers 13 and 14 which are pivotally interconnected by a pin 15 to provide a plier-like hand tool. The die members are arranged on the levers for movement into and out of mating engagement with each other in response to movement of the tool levers about pin 15.

Die member 11 has a planar surface 18 from which project a pair of spaced locating pins 19. The tool is constructed for splicing together the free ends of two lengths 20 and 21 of motion picture film 22. The lengths of film may be defined by the ends of two separate reels of film which are to be connected together, or by a single reel of film which has broken and is to be repaired by splicing. As shown in FIG. 3, the film has regularly spaced rectangular sprocket holes 23 formed through the film along and adjacent to each edge of the film. Each locating pin above surface 18 is configured to mate with a sprocket hole; to this end, each locating pin has parallel sides spaced to mate with the sides of a sprocket hole. The locating pins are spaced apart a distance equal to an integral multiple of the distance between adjacent sprocket holes in film 22. The ends of the locating pins which project from die member 11 beyond surface 18 are received in recesses 25 formed in a planar surface 26 of die member 12 when the die members are mated. During use of the tool, the locating pins are engaged in two sprocket holes of one of the lengths of film to be connected to align the film on die member 10 in a predetermined position.

A pair of spaced knife edged slitting dies 28 are provided on die member 12 and project from die surface 26. The slitting dies are arranged parallel to each other and extend transversely of the elongate extent of the die member. One slitting die is located close to one edge of die member 12, and the other slitting die is located close to the other edge of the die member. Each slitting die has a side surface 29 disposed normal to surface 26.

Each slitting die cooperates with a recess 30 formed in surface 18 of die member 11. Each recess has a straight wall 31 past which surface 29 of the corresponding slitting die slides as the die members are mated.

The slitting dies are arranged so that, as the die members are mated around a length of film 22 registered on the locating pins, a first slit 32 and a second slit 33 are formed in the film, as shown in FIG. 3 relative to film length 20. Slit 32 extends transversely of the film from one edge of the film to the midpoint of the width of the film. Slit 33 extends from the other edge of the film to the midpoint of the width of the film.

Die member 12 has a projection 35 extended from one end thereof. The projection has rounded corners and has a dimension transversely of the die member equal to the width of film 22. The projection is oriented so that it is centered across the width of the film strip registered on locating pins 19. The projection cooperates with a correspndingly configured recess 36 in a plate 37 secured to die member 11. The projection and the recessed plate together define cooperating end squaring die means for providing a squared end 38 of film length 20; this squared end and slits 32 and 33 are formed in the film length by engaging the film on die member 11 so that the free end of the film extends over plate 37 and by closing the die members over the film length.

Two circular die pins 40 project from surface 18 of die member 11 along the center of the width of the die member. Each die pin is located tangent to side wall 31 of a corresponding recess 30 between the recess and plate 37 in such a position that each pin is also tangent to surface 29 of a corresponding slitting die 28 at the inboard end of the respective slitting die when the die members are mated. Surfaces 29 open toward projection 36. When the die members are mated, die pins 40 are received in cooperating die recesses 41 formed in surface 28 of die member 12. Die pins 40 and die recesses 41 coact upon mating engagement of the die members around film length 20 to form holes 42 in the film, as shown in FIG. 3. The holes are tangent to the inner ends of slits 32, 33 on the sides of the slits toward squared film end 38.

Two additional die pins 43 project from the surface of die member 11 as shown in FIG. 1. Each die pin 43 is centered along wall 31 of a corresponding recess 30 in such a position that it forms a notch 44 in the edge of film strip 20 where a corresponding one of slits 32, 33 opens to the edge of the film. The die pins are shaped with quarter circle recesses tangent to each other at the end of the adjacent slitting die means so that the notches produced in the film strip have rounded corners. Each die pin 43 cooperates with a corresponding die recess 45 formed in die member 12. Each slitting die 28 terminates at one of these die recesses.

A pair of conically pointed guide pins 47 project from die member 11 and engage in guide recesses 48 formed in the other die member. The guide pins and recesses cooperate as the die members are moved together to assure that the die members are aligned in proper mating relation.

In order that the free ends of film lengths 20 and 21 may be interconnected, each film length in its turn is engaged with die member 11 so that the end of the film strip overlies plate 37. The die members are then mated and the die elements carried by the die members coact to provide features 32, 33, 38, 42, and 44 in film length 20, and corresponding features 32', 33', 38', 42', and 44' in film length 21. Then, as shown in FIG. 4, the ends of the film lengths are overlaid in axial alignment between their second slits 33, 33' and their squared ends 38, 38'. The unslitted width of each film length laterally of and in line with each first slit 32, 32' is then engaged in the second slit 33, 33' of the other film length and the corresponding edges of the film lengths are registered with each other. The interlinked film lengths are then grasped on opposite ends of the spliced area and tension is applied to the splice to cause the film lengths to slip axially of each other a distance equal to twice the diameter of holes 42, 42' to bring the sprocket holes in the overlaid lengths of film into registry with each other. The splice is then complete.

It will be apparent that the die projections and die recesses of die members 11 and 12 are arranged in a predetermined relation relative to each other in order that the sprocket holes of the film lengths may be in registry after the lengths have been interlinked and the splice placed in tension. More specifically; slitting dies 28 are arranged relative to locating pins 19 and end squaring die means 35–37 such that slits 32, 33 are displaced, in a direction opposite to the squared end of the film length, from a line transversely of the film length between adjacent sprocket holes a distance equal to the diameter of holes 42. Obviously, however, the slitting dies could be located to form slits 32, 33 along lines bisecting the space between adjacent sprocket holes so that the sprocket holes in the overlaid lengths of film would be in registry upon initial interlinking of the film lengths. It is preferred, however, that holes 42, 42' be provided at the ends of slits 32, 32', 33, 33' to impart greater tensile strength to the splice. The holes prevent stress concentration at the inner ends of the slits, and therefore more tension must be applied to the splice illustrated to cause the splice to fail than must be applied to produce failure in a splice wherein the holes are not present. Also, holes 42, 42' provide a lock feature in the splice so that the interlinked film lengths cannot become disconnected in the event the film lengths are moved angularly of each other in the plane of the splice. Further, and perhaps most importantly, the holes provide a means whereby proper registration of the film sprocket holes is assured.

FIG. 2 is an exploded perspective view of the die members 11 and 12' of another splicing tool according to this invention; die member 12' is similar to die member 12 and the structural features thereof which are similar to the structural features of die member 12 are designated by primed reference numbers corresponding to those appearing in FIG. 1. Die member 12' differs from die member 12, however, by defining an elongate recess 50 in die surface 26' between slitting dies 28'. The recess has a rectangular planform configuration with a width less than the width of film 22 between the sprocket holes; the recess is located so that it is centered along the length of a film strip engaged in die member 11. The recess is adapted to receive a transfer tape 51 having a preferably transparent central pressure-sensitive adhesive layer 52 laminated between two release liners 53 and 54. The adhesive has a greater affinity for release liner 54 than for liner 53, but both release liners are releasable from the adhesive.

The structure shown in FIG. 2 is used by stripping release liner 53 from the transfer tape and disposing the tape in recess 50 with release liner 54 disposed downward. The first length of film to be joined in a splice is then engaged with guide pins 19. The die members are then mated and the adhesive layer of the transfer tape adheres to the film as the squared end, slits, holes and notches are formed in the film. The other film length is then operated upon by the die members. Before the film lengths are interlinked, release liner 54 is removed from the adhesive layer and the film lengths are overlaid so that the adhesive layer is disposed between the film lengths. The lengths are then rapidly interlinked and slipped axially relative to each other to produce the desired splice. Pressure may then be applied to the splice to cause the adhesive to adhere securely to the film lengths. The interlinking and axial slipping steps of the splicing process should be performed rapidly before the adhesive has an opportunity to bond securely to the film lengths.

From the foregoing, it is apparent that this invention provides a novel method for splicing together two lengths of strip material such as motion picture film. The splice produced does not require the use of any fusing or solvent welding process; an adhesive may be used as a supplement to the mechanical plice, if desired, however. The splice, whether or not an adhesive is used, tracks properly through a motion picture projector or similar device without jamming in the projector. The splice may be made rapidly by a relatively untrained person. The tool provided by this invention is simple to operate. The splice, therefore, can be made under almost any conditions at almost any location.

It was mentioned that the method and apparatus of this invention may be used in conjunction with the film projection system described in Patent 3,379,488. From the foregoing, it is apparent that this is true since tool 10 is portable and the splice provided by its use can be made wherever desired. It is equally apparent, however, that the tool and the method described can be used with any film system. Further, the method can be used to splice together lengths of strip material other than motion picture films.

The invention has been described above with reference to presently preferred embodiments of the invention. It will be apparent to workers skilled in the art to which the invention relates that modifications and alterations may be made in the structures and procedures described without departing from the scope of the invention and the teachings herein presented. Accordingly, the foregoing description is not to be regarded as limiting the scope of the invention.

What is claimed is:

1. The method of splicing together two lengths of photographic film having uniformly spaced sprocket holes therethrough along at least one side margin, the method including the steps of:
  (a) forming in the terminal portion of each length of film at locations equally spaced from each other therealong first and second slits which extend halfway across the width of the film length, the first slits extending from a common edge of the film length terminal portions adjacent the ends thereof and the second slits extending from the other edge of the film lengths at locations spaced away from the ends of the lengths,
  (b) interlinking the film length terminal portions so that they overlie each other between the second slits and the ends thereof with the respective edges aligned by engaging the unslitted width of each portion latrally of the first slit therein in the second slit of the other portion, and
  (c) forming the slits on one portion at such locations therealong that the marginal sprocket holes therein register with the sprocket holes in the other portion when the portions are interlinked and tension is applied thereto.

2. The method according to claim 1 including the step of forming in each terminal portion of each film length a hole in the central part of the film tangent to each slit therein at the mid-width of the film and on side of the slit toward the end of the respective film length.

3. The method according to claim 2 wherein each slit is formed transversely of the respective film length at a location spaced from, in a direction away from the film length end, a line transversely of the film midway between adjacent sprocket holes a distance equal to the diameter of said holes.

4. The method according to claim 1 including the step of squaring the end of each film length as the slits therein are formed.

References Cited
UNITED STATES PATENTS 1,053,126  2/1913  Fuller et al. _____ 24—17 X
2,433,446  12/1947  Foster _____ 287—64

WILLIAM I. BROOKS, *Primary Examiner.*